(12) United States Patent
Saruwatari et al.

(10) Patent No.: US 9,843,044 B2
(45) Date of Patent: Dec. 12, 2017

(54) POSITIVE ELECTRODE

(71) Applicant: Kabushiki Kaisha Toshiba, Minato-ku (JP)

(72) Inventors: Hidesato Saruwatari, Kawasaki (JP); Takuya Iwasaki, Uenohara (JP); Koji Takazawa, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/455,999

(22) Filed: Mar. 10, 2017

(65) Prior Publication Data

US 2017/0187038 A1    Jun. 29, 2017

Related U.S. Application Data (63) Continuation of application No. 12/862,133, filed on Aug. 24, 2010, now Pat. No. 9,634,328.

(30) Foreign Application Priority Data

Aug. 25, 2009  (JP) ................... 2009-194547
Aug. 12, 2010  (JP) ................... 2010-181072

(51) Int. Cl.
   *H01M 4/505*   (2010.01)
   *H01M 4/525*   (2010.01)
   (Continued)

(52) U.S. Cl.
   CPC .......... *H01M 4/505* (2013.01); *H01M 4/131* (2013.01); *H01M 4/485* (2013.01); *H01M 4/525* (2013.01);
   (Continued)

(58) Field of Classification Search
   None
   See application file for complete search history.

(56) References Cited

U.S. PATENT DOCUMENTS

2002/0086210 A1   7/2002   Naruoka et al.
2005/0142442 A1   6/2005   Yuasa et al.
(Continued)

FOREIGN PATENT DOCUMENTS

JP   6-215773    8/1994
JP   10-69910    3/1998
(Continued)

OTHER PUBLICATIONS

Japanese Office Action dated May 15, 2012, in Japan patent Application No. 2010-181072.
(Continued)

*Primary Examiner* — Daniel Gatewood
(74) *Attorney, Agent, or Firm* — Oblon, McClelland, Maier & Neustadt, L.L.P.

(57) ABSTRACT

According to one embodiment, a positive electrode includes a positive electrode layer and a positive electrode current collector. The positive electrode layer includes a positive electrode active material including a first oxide represented by the following formula (α) and/or a second oxide represented by the following formula (β). The positive electrode layer has an intensity ratio falling within a range of 0.25 to 0.7. The ratio is represented by the following formula (1) in an X-ray diffraction pattern obtained by using CuKα radiation for a surface of the positive electrode layer.

$$Li_xNi_{1-a-b}Co_aMn_bM_cO_2 \quad (\alpha)$$

$$Li_xNi_{1-a-c}Co_aM_cO_2 \quad (\beta)$$

$$I_2/I_1 \quad (1)$$

19 Claims, 5 Drawing Sheets

(51) Int. Cl.
  *H01M 4/131* (2010.01)
  *H01M 4/485* (2010.01)
  *H01M 10/0569* (2010.01)
  *H01M 4/02* (2006.01)

(52) U.S. Cl.
  CPC .. *H01M 10/0569* (2013.01); *H01M 2004/028* (2013.01); *H01M 2300/0028* (2013.01)

(56) References Cited

U.S. PATENT DOCUMENTS

2007/0196736 A1  8/2007  Takahashi et al.
2009/0023067 A1* 1/2009  Park .................. C01G 51/42
                                                 429/223

FOREIGN PATENT DOCUMENTS

| JP | 11-154509 | 6/1999 |
|---|---|---|
| JP | 2000-340229 | 12/2000 |
| JP | 2001-167761 A | 6/2001 |
| JP | 2002-151076 A | 5/2002 |
| JP | 2002-167220 A | 6/2002 |
| JP | 2002-279985 | 9/2002 |
| JP | 2002-313420 | 10/2002 |
| JP | 2003-168434 | 6/2003 |
| JP | 2003-197256 | 7/2003 |
| JP | 2003197256 A * | 7/2003 |
| JP | 2004-031165 | 1/2004 |
| JP | 2004-172113 A | 6/2004 |
| JP | 2004-172114 A | 6/2004 |
| JP | 2005-019086 | 1/2005 |
| JP | 2005-197004 A | 7/2005 |
| JP | 2005-317499 | 11/2005 |
| JP | 2007-123255 A | 5/2007 |
| JP | 2009-21251 | 1/2009 |
| JP | 2009-151959 | 7/2009 |

OTHER PUBLICATIONS

Office Action dated Aug. 7, 2012 in Japanese Patent Application No. 2010-181072.
Office Action dated Nov. 6, 2012 in Japanese Patent Application No. 2010-181072.
Notice of Reasons for Rejection dated Apr. 23, 2013, in Japanese Patent Application No. 2010-181072 filed Aug. 12, 2010.
Office Action dated Jun. 24, 2014, in Japanese Patent Application No. 2013-021355 filed Feb. 6, 2013.
Office Action dated Apr. 1, 2014, in Japanese Patent Application No. 2013-021355 filed Feb. 6, 2013.
Mijung et al., Water adsorption and storage characteristics of optimized $LiCoO_2$ and $LiNi1/3Co1/3Mn1/3O_2$ composite cathode material for Li-ion cells, Apr. 2006, J Electrochem Soc, 153, A935-A940.
Liu et al., A mixture of $LiNi1/3Co1/3Mn1/3O_2$ and $LiCoO_2$ as positive active material of LIB for power application, Jun. 2007, J Power Sources, 174, 1126-1130.
Lin et al., Electrochemical studies on mixtures of $LiNi0.8Co0.17Al0.03O_2$ and $LiCoO_2$ cathode materials for lithium ion batteries, Jan. 2005, Solid state communications, 133, 687-690.

* cited by examiner

POSITIVE ELECTRODE

CROSS-REFERENCE TO RELATED APPLICATIONS

This application is a continuation of Ser. No. 12/862,133, having a filing date of Aug. 24, 2010, now U.S. Pat. No. 9,634,328, which is based upon and claims the benefit of priority from Japanese Patent Application No. 2009-194547, filed on Aug. 25, 2009; and No. 2010-181072, filed on Aug. 12, 2010; the entire contents of both of which are incorporated herein by reference.

FIELD

Embodiments described herein relate generally to a positive electrode, a nonaqueous electrolyte battery and a battery pack.

BACKGROUND

It is known that an electrode for a nonaqueous electrolyte secondary battery is prepared by, for example, adding a conductive agent and a binder to an active material, suspending them in a suitable solvent, applying this slurry-like suspension on a current collector, followed by drying and pressing. Furthermore, it is also known that the plane orientation of the electrode active material varies according to the condition of preparation for the electrode such as the condition of dispersion during the step for preparing the suspension, the condition for applying the suspension and the condition for the following pressing, and that the plane orientation greatly affects the performance of batteries. For example, JP-A 2003-168434 (KOKAI) discloses that an intensity ratio is adjusted to 0.005 or more and less than 0.025 since an electrode density decreases when an intensity ratio I(104)/I(003) is adjusted to 0.025 or more. I(104) is the diffraction peak intensity of the (104) plane in X-ray diffraction for the surface of a positive electrode active material layer using CuKα radiation, and I(003) is the diffraction peak intensity of the (003) plane in X-ray diffraction.

DETAILED DESCRIPTION

In general, according to one embodiment, a positive electrode includes a positive electrode layer and a positive electrode current collector. The positive electrode layer includes a positive electrode active material including a first oxide represented by the following formula (α) and/or a second oxide represented by the following formula (β). The positive electrode layer has an intensity ratio falling within a range of 0.25 to 0.7. The ratio is represented by the following formula (1) in an X-ray diffraction pattern obtained by using CuKα radiation for a surface of the positive electrode layer:

$$Li_xNi_{1-a-b}Co_aMn_bM_cO_2 \qquad (\alpha)$$

wherein $0.9 < x \leq 1.25$, $0 < a \leq 0.4$, $0 \leq b \leq 0.45$ and $0 \leq c \leq 0.1$, and M is at least one element selected from Mg, Al, Si, Ti, Zn, Zr, Ca and Sn, $$Li_xNi_{1-a-c}Co_aM_cO_2 \qquad (\beta)$$

wherein $0.9 < x \leq 1.25$, $0 < a \leq 0.4$ and $0 \leq c \leq 0.1$, and M is at least one element selected from the group consisting of Mg, Al, Si, Ti, Zn, Zr, Ca and Sn, $$I_2/I_1 \qquad (1)$$

wherein $I_1$ is an intensity of a main peak in 2θ falling within a range of 15° to 25° in the X-ray diffraction pattern, and $I_2$ is an intensity of a main peak in 2θ falling within a range of 40° to 50° in the X-ray diffraction pattern.

The nonaqueous electrolyte battery according to the embodiment includes the positive electrode according to the embodiment, a negative electrode and a nonaqueous electrolyte.

The battery pack according to the embodiment includes the nonaqueous electrolyte battery according to the embodiment.

Hereinafter the positive electrode, the nonaqueous electrolyte battery and the battery pack according to the embodiments will be explained.

First Embodiment

The positive electrode according to the first embodiment comprises a positive electrode layer and a positive electrode current collector, in one surface or both surfaces of which the positive electrode layer is formed. The positive electrode layer comprises a positive electrode active material. The positive electrode active material comprises $Li_xNi_{1-a-b}Co_aMn_bM_cO_2$, wherein $0.9 < x \leq 1.25$, $0 < a \leq 0.4$, $0 < b \leq 0.45$ and $0 \leq c \leq 0.1$, and M is at least one element selected from the group consisting of Mg, Al, Si, Ti, Zn, Zr, Ca and Sn (hereinafter this oxide is referred to as a first oxide), or $Li_xNi_{1-a-c}Co_aM_cO_2$, wherein $0.9 < x \leq 1.25$, $0 < a \leq 0.4$ and $0 \leq c \leq 0.1$, and M is at least one element selected from Mg, Al, Si, Ti, Zn, Zr, Ca and Sn (hereinafter this oxide is referred to as a second oxide). The positive electrode active material may include both the first and second oxides.

The positive electrode layer has an intensity ratio falling within a range of 0.25 to 0.7, the ratio being represented by the following formula (1) in an X-ray diffraction pattern obtained by using CuKα radiation for the surface of the positive electrode layer:

$$I_2/I_1 \qquad (1)$$

wherein $I_1$ is an intensity of a main peak in 2θ falling within a range of 15° to 25° in the X-ray diffraction pattern using CuKα radiation, and $I_2$ is an intensity of a main peak in 2θ falling within a range of 40° to 50° in the X-ray diffraction pattern. As used herein, the main peak refers to a peak which shows the maximum peak within a predetermined range of 2θ.

As the positive electrode active material for the nonaqueous electrolyte battery, layered lithium oxides such as $LiCoO_2$, $Li(Ni_\alpha, Co_\beta, Mn_\gamma)O_2$ ($0 < \alpha < 1$, $0 < \beta < 1$, $0 < \gamma < 1$, $\alpha + \beta + \gamma = 1$) and $LiNiO_2$ are known. Since the shapes of primary particles and those of secondary particles are rarely different in layered lithium oxides such as $LiCoO_2$, the positive electrode layer becomes dense, the contact between the particles is sufficiently retained, and the electric resistance of the positive electrode layer is decreased, by uniformly dispersing the primary particles in the positive electrode. Since the X-ray diffraction chart of the positive electrode layer directly reflects the plane orientation possessed by $LiCoO_2$, the peak of the (003) plane appears strongly. Meanwhile, although the $LiCoO_2$ having the (003) plane orientation has excellent crystallinity, high energy density cannot be obtained.

On the other hand, since the first oxide and second oxide are one kind of layered lithium composite oxides, have higher energy density than $LiCoO_2$ and are more excellent in safety (heat stability) than $LiNiO_2$, they are useful positive electrode active materials. The first oxide and second oxide have forms of secondary particles formed by aggregation of fine primary particles. The difference in the form is due to differences in raw material powders and condition of baking. The inventors have done intensive studies and found for the first time that the resistance of a battery is increased greatly during the charge and discharge cycles by releasing aggregation of the primary particles so that the primary particles may be dispersed uniformly when the first oxide or second oxide is used for preparing a positive electrode. Furthermore, they have also ascertained that the cause thereof is that the surface area of the electrode is increased and the reactivity between the positive electrode and nonaqueous electrolyte is increased by releasing aggregation of the primary particles. In order to solve the problem of reactivity, the amount of binder to be added is increased. However, since the amount of an insulating material in the positive electrode active material is increased in this method, the resistance of the positive electrode at the initial period of the charge and discharge cycles is increased. When a battery resistance is high, charging and discharging under a high current becomes essentially difficult.

Furthermore, the inventors have found that there is a correlation between the dispersibility of the positive electrode active material and the intensity ratio of the formula (1) as mentioned above in the positive electrode comprising the first oxide or second oxide. Namely, when the intensity ratio is less than 0.25, the primary particles aggregate little and the dispersibility of the primary particles is high, the battery resistance increases greatly during charge and discharge cycles. On the other hand, when the intensity ratio is more than 0.7, the form of the secondary particles is maintained but dispersion of the conductive agent in the positive electrode layer becomes insufficient, which results in a positive electrode having a high resistance. By adjusting the intensity ratio to the range of 0.25 to 0.7, the form of the secondary particles is maintained and the dispersing state of the conductive agent in the positive electrode active material may be improved, whereby increase in the resistance when charge and discharge cycles are repeated may be suppressed. Accordingly, a large current may be charged and discharged even after repeating the charge and discharge cycles. A more preferable range of the intensity ratio is from 0.3 to 0.55.

Hereinafter, the method for measuring an X-ray diffraction pattern using CuKα radiation in order to obtain the intensity ratio will be explained. Although the method for measuring X-ray diffraction pattern is not specifically limited, it is measured under the conditions of, for example, θ/2θ continuous measurement method, an acceleration voltage of 40 kv, an acceleration current of 100 mA and a scanning velocity of 1°/min when a rotor-flex type X-ray source is used.

In the X-ray diffraction pattern measured by the above-mentioned method, a main peak which appears in the range of 2θ of 15° to 25° and a main peak which appears in the range of 2θ of 40° to 50° are determined.

When a battery is disintegrated, and a positive electrode is taken from the battery and measured by X-ray diffraction, the battery is disintegrated and the electrode is taken therefrom according to the following method.

At first, the battery is put into a discharge state. The discharge state is a state in which a battery is discharged, for example, until the battery reaches the recommended lower limit voltage of the battery. The electrode group is taken from the external package of the battery in the discharge state under inert atmosphere (for example, argon atmosphere). The electrode group is disintegrated, only a positive electrode is removed, and the removed positive electrode is cut into any size so that the electrode fits the size of a glass plate which is used for the measurement of the X-ray diffraction pattern. The cut-away positive electrode is washed by using, for example, a methylethylcarbonate solvent so as to dissolve the Li salt in the positive electrode, and the washed positive electrode is dried under reduced pressure to evaporate the solvent. The dried positive electrode was attached to a glass plate for measurement, and X-ray diffraction measurement was carried out.

When the content ratio of the first oxide or second oxide to the weight of the positive electrode layer is 40 wt % to 95 wt %, the effect by the first embodiment is obtained more easily. Furthermore, it is preferable that the content ratio of the first oxide be higher since the energy density of the battery is improved.

As the first oxide, a layered lithium composite oxide wherein $0<a\leq0.2$, $0<b\leq0.3$ and $0\leq c\leq0.01$ is preferable. This is because, the higher the Ni ratio in the transition metal, the higher the energy density of the oxide itself. As the positive electrode active material, the first oxide may be used alone, or may comprise other active material. Meanwhile, when the content ratio of the first oxide to the weight of the positive electrode layer is 40 wt % or more, the effect by the first embodiment is more easily obtained, and an effect of increase of energy density may be sufficiently obtained. The more preferable content of the first oxide in the weight of the positive electrode layer is 60 wt % to 95 wt %.

The second oxide is preferably a layered lithium composite oxide in the range of $0<a\leq0.2$ and $0\leq c\leq0.05$. This is because, the higher the Ni ratio in the transition metal, the higher the energy density of the oxide itself. As the positive electrode active material, the second oxide may be used alone, or may include other active material. Meanwhile, when the content ratio of the second oxide to the weight of the positive electrode layer is 40 wt % to 95 wt %, the effect by the first embodiment is obtained more easily, and the effect of increase of the energy density may be obtained sufficiently. The more preferable content of the second oxide in the weight of the positive electrode layer is 60 wt % to 95 wt %.

Examples of other positive electrode active materials than the first oxide and second oxide may include manganese dioxide ($MnO_2$), iron oxide, copper oxide, nickel oxide, $Li_aMnO_2$, lithium-cobalt composite oxide, lithium-manganese-cobalt composite oxide, lithium-manganese-nickel composite oxide, spinel-type lithium-manganese composite oxide, spinel-type lithium-manganese nickel composite oxide (e.g., $Li_aMn_{2-b}Ni_bO_4$), lithium phosphorous oxide having an olivine structure, iron sulfate ($Fe_2(SO_4)_3$) and vanadium oxide (e.g., $V_2O_5$), wherein a and b are preferably 0<a≤1.2 and 0≤b≤1. These positive electrode active materials may be used alone or as a mixture of two or more kinds.

Examples of the lithium-cobalt composite oxide may include $Li_aCoM_hO_2$ (wherein M is at least one or two or more elements selected from the group consisting of Al, Cr, Mg and Fe, and 0≤h≤0.1).

Examples of the lithium-manganese-cobalt composite oxide may include $LiMn_{1-g-h}Co_gM_hO_2$ (wherein M is at least one or two or more elements selected from the group consisting of Al, Cr, Mg and Fe, and 0≤g≤0.5).

Examples of the lithium-manganese-nickel composite oxide may include $LiMn_jNi_jM_{1-2j}O_2$ (wherein M is at least one or two or more elements selected from the group consisting of Co, Cr, Al, Mg and Fe, ⅓≤j≤½), $LiMn_{1/3}Ni_{1/3}Co_{1/3}O_2$ and $LiMn_{1/2}Ni_{1/2}O_2$.

Examples of the spinel-type lithium-manganese composite oxide may include $Li_aMn_{2-b}M_bO_4$ (wherein M is at least one or two or more elements selected from the group consisting of Al, Cr, Ni and Fe).

Examples of the lithium phosphorous oxide having an olivine structure may include $Li_aFePO_4$, $Li_aFe_{1-b}Mn_bPO_4$, $Li_aCoPO_4$ and the like. It is preferable that a and b in the above-mentioned composition formulas be 0<a≤1.2 and 0≤b≤1, respectively.

Examples of the other positive electrode active material may include electroconductive polymer materials such as polyaniline and polypyrrole, organic materials such as disulfide polymer materials and fluorocarbons, and inorganic materials such as sulfur (S).

More preferable examples of the other positive electrode active material may include lithium-cobalt composite oxide, lithium-manganese-nickel composite oxide, spinel-type lithium-manganese composite oxide, spinel-type lithium-manganese-nickel composite oxide, lithium-manganese-cobalt composite oxide and lithium iron phosphate.

A further preferable other positive electrode active material is $Li_xCo_yM1_zO_2$ (wherein 0.9≤x≤1.1, 0.85≤y≤1 and 0≤z≤0.1, and M1 is at least one or two or more elements selected from Al, Si, Ti, Zn, Zr, Ca and Sn). By using $Li_xCo_yM1_zO_2$ in combination, generation of gas during charge and discharge cycle may be suppressed.

The composition of the positive electrode active material may be confirmed by the following method. A positive electrode is taken from a disintegrated battery, and a positive electrode layer is peeled from a current collector of the positive electrode. The peeled positive electrode layer is dissolved in an acid. The obtained solution is subjected to inductively coupled plasma spectrometry, whereby the composition of the positive electrode active material may be identified.

The average particle diameter of the positive electrode active material is desirably 1 μm to 20 μm.

When a binder is contained in the positive electrode layer, examples of the binder may include polytetrafluoroethylene (PTFE), polyvinylidene fluoride (PVdF) and fluoro-based rubber.

Furthermore, the positive electrode layer may also comprise a conductive agent. Examples of the conductive agent may include carbonaceous materials such as acetylene black, carbon black and graphite.

The composition ratio of the positive electrode active material, conductive agent and binder is preferably 73 to 95 wt % for the positive electrode active material, 3 to 20 wt % for the conductive agent and 2 to 7 wt % for the binder.

The positive electrode current collector is desirably formed by an aluminum foil or aluminum alloy foil. The average crystal grain size of the aluminum foil and aluminum alloy foil is preferably 50 μm or less, more preferably 30 μm or less, and further preferably 5 μm or less. By adjusting the average crystal grain size to 50 μm or less, the intensity of the aluminum foil or aluminum alloy foil may be increased significantly, the positive electrode may have a high density at a high pressure, and the battery volume may be increased.

The average crystal grain size is obtained as follows. Specifically, the texture of the current collector surface is observed with an electron microscope to obtain the number n of crystal grains present within an area of 1 mm×1 mm. Then, the average crystal grain area S is obtained from the formula "$S=1\times10^6/n$ (μm$^2$)", where n denotes the number of crystal grains noted above. Further, the average crystal grain size d (μm) is calculated from the area S by formula (A) given below:

$$d=2(S/\pi)^{1/2} \tag{A}$$

The average crystal grain size of the aluminum foil and aluminum alloy foil is varied due to complex effect of plural factors such as material texture, impurities, condition of processing, history of heat treatment and condition of annealing. The crystal grain size may be adjusted by combining the above-mentioned factors in the steps for producing the current collector.

The thickness of the aluminum foil and aluminum alloy foil may be 20 μm or less, more preferably 15 μm or less. The purity of the aluminum foil is preferably 99% by mass or more. Preferable aluminum alloy is an alloy comprising elements such as magnesium, zinc and silicon. On the other hand, the content of a transition metal such as iron, copper, nickel and chromium is preferably 1% by mass or less.

The positive electrode is prepared by, for example, adding the conductive agent and binder to the positive electrode active material comprising the first oxide or second oxide, suspending the resultant material in a suitable solvent, applying the suspension (slurry) on the current collector, followed by drying and pressing to form a belt-like electrode.

The intensity ratio represented by the above-mentioned formula (1) may be adjusted by, for example, the condition of dispersion during the step for preparing the suspension, the condition for applying the suspension, the condition of the following pressing, and the like during the preparation of the electrode. The condition of dispersion during the preparation of the suspension is important. When the condition of dispersion is too strong, the form of the secondary particles tends to be collapsed. On the other hand, when the condition of dispersion is too weak, an electrode having poor uniformity is obtained. An example of a suitable means for dispersion during preparation of the suspension include mill dispersion using beads having a diameter of 0.5 mm or less. It is known that a means for dispersion using beads having a small bead diameter is used for dispersing a material having a small particle diameter. However, such a method is considered to be unsuitable for a powder comprising particles having a particle diameter of 1 μm or more as referred to in the first embodiment since disintegration force is insufficient. The inventors have found that it is preferable to disperse a powder in the form of secondary particles formed by aggregation of primary particles under the condition of small disintegration force, and achieved the invention of the first embodiment.

Meanwhile, examples of the lithium composite oxide in the form of secondary particles include a spinel-type lithium-manganese oxide. However, since it is not possible for the spinel-type lithium-manganese oxide to release aggregation of the primary particles by the above-mentioned method for dispersion, an effect of suppressing increase of a resistance may not be obtained in a positive electrode using only a spinel-type lithium-manganese oxide as a positive electrode active material even if the intensity ratio is adjusted to 0.25 to 0.7.

Second Embodiment

The nonaqueous electrolyte battery according to the second embodiment comprises the positive electrode of the first embodiment, a negative electrode and a nonaqueous electrolyte. The nonaqueous electrolyte battery may comprise a separator between the positive electrode and the negative electrode. Furthermore, the nonaqueous electrolyte battery may comprise an housing in which the positive electrode, negative electrode, nonaqueous electrolyte and the like are housed.

Hereinafter, the negative electrode, nonaqueous electrolyte, separator and housing will be explained in detail.

1) Negative Electrode

The negative electrode comprises a current collector, and a negative electrode layer which is carried by one or both surfaces of the current collector and comprises a negative electrode active material, a conductive agent and a binder. The negative electrode is prepared by, for example, adding a conductive agent and a binder to a powdery negative electrode active material, suspending them in a suitable solvent, applying the suspension (slurry) on the current collector, followed by drying and pressing to form a belt-like electrode.

As the current collector, for example, a copper foil, aluminum foil or aluminum alloy foil may be used. It is desirable that the aluminum foil or aluminum alloy foil which constitutes the current collector have an average crystal grain size of 50 µm or less, more preferably 30 µm or less, further preferably 5 µm or less. The average crystal grain size may be obtained by the above-mentioned method. By adjusting the average crystal grain size of the aluminum foil or aluminum alloy foil to 50 µm or less, the strength of the aluminum foil or aluminum alloy foil may be increased. Therefore, it is possible to increase the capacity of the negative electrode by increasing the pressure during pressing to increase the density of the negative electrode layer. Also, since it is possible to prevent the dissolution and corrosion deterioration of the current collector over an over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery.

The average crystal grain size of the aluminum foil or aluminum alloy foil varies due to complex effects of plural factors such as material texture, impurity, condition of processing, history of heat treatment and condition of annealing. The crystal grain size may be adjusted by combining the above-mentioned factors during the step for preparing the current collector.

It is desirable that the thickness of the aluminum foil or aluminum alloy foil be 20 µm or less, more preferably 15 µm or less. The purity of the aluminum foil is preferably 99% by mass or more. A preferable aluminum alloy is an alloy comprising elements such as magnesium, zinc and silicon. The content of a transition metal which is included as a component of the alloy such as iron, copper, nickel and chromium is preferably 1% by mass or less.

Examples of the negative electrode active material may include a lithium-titanium composite oxide. Examples of the lithium-titanium composite oxide may include spinel-type lithium titanate represented by $Li_{4+x}Ti_5O_{12}$ (wherein x varies within the range of $-1 \leq x \leq 3$ by charge and discharge reactions), a ramsdellite-type $Li_{2+x}Ti_3O_7$ (wherein x varies within the range of $-1 \leq x \leq 3$ by charge and discharge reactions), and a metal composite oxide comprising Ti and at least one element selected from the group consisting of P, V, Sn, Cu, Ni and Fe. Examples of the metal composite oxide comprising Ti and at least one element selected from the group consisting of P, V, Sn, Cu, Ni and Fe may include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni and Fe). The metal composite oxide preferably has a low crystallinity, and has a micro structure in which a crystalline phase and an amorphous phase coexist or the amorphous phase exists alone. The metal composite oxide having such micro structure may improve the cycle performance. These metal composite oxides are converted to lithium-titanium composite oxides by inserting lithium by charging. Among these lithium-titanium composite oxides, the spinel-type lithium titanate is preferable since it is excellent in cycle property.

Examples of other negative electrode active material may include carbonaceous materials and metal compounds.

Examples of the carbonaceous materials may include natural graphite, artificial graphite, coke, vapor-grown-carbon fiber, mesophase pitch-based carbon fiber, spherical carbon and resin baking carbon. More preferable carbonaceous materials may include vapor-grown-carbon fiber, mesophase pitch-based carbon fiber and spherical carbon. It is preferable that the carbonaceous material have a layer spacing $d_{002}$ of the (002) plane by X-ray diffraction of 0.34 nm or less.

As the metal compound, metal sulfides or metal nitrides may be used. Examples of the metal sulfide may include titanium sulfides such as $TiS_2$, molybdenum sulfides such as $MoS_2$, and iron sulfides such as FeS, $FeS_2$ and $L_xFeS_2$. As the metal nitride, for example, lithium cobalt nitride (for example, $Li_sCo_tN$ wherein $0 < s < 4$ and $0 < t < 0.5$) may be used.

Examples of the binder may include polytetrafluoroethylene (PTFE), polyvinylidene fluoride (PVdF), fluoro-based rubber, styrene butadiene rubber and the like.

The composition ratio of the negative electrode active material, conductive agent and binder is preferably in the ranges of 73 to 96 wt % for the negative electrode active material, 2 to 20 wt % for the conductive agent and 2 to 7 wt % for the binder.

2) Nonaqueous Electrolyte

The nonaqueous electrolyte comprises a nonaqueous solvent and an electrolyte salt dissolved in the nonaqueous solvent. The nonaqueous solvent may include a polymer.

Examples of the electrolyte salt may include lithium salts such as $LiPF_6$, $LiBF_4$, $Li(CF_3SO_2)_2N$ (lithium bistrifluoromethanesulfonylamide; also known as LiTFSI), $LiCF_3SO_3$ (also known as LiTFS), $Li(C_2F_5SO_2)_2N$ (lithium bispentafluoroethanesulfonylamide; also known as LiBETI), $LiClO_4$, $LiAsF_6$, $LiSbF_6$, lithium bis-oxalatoborate (LiB$(C_2O_4)_2$ (also known as LiBOB)) and difluoro(trifluoro-2-oxide-2-trifluoro-methylpropionate(2-)-0,0) lithium borate ($LiBF_2OCOOC(CF_3)_2$) (also known as $LiBF_2$(HHIB))).

These electrolyte salts may be used alone or as a mixture of two or more kinds. Specifically, preferable examples may include $LiPF_6$ and $LiBF_4$.

It is preferable that the electrolyte salt concentration is adjusted to 1 to 3 mol/L. By defining the electrolyte concentration to such range, the performance when high load current is applied may be further increased while the increase in viscosity by increase of the electrolyte salt concentration is suppressed.

Although the nonaqueous solvent is not specifically limited, examples of the nonaqueous solvent may include propylenecarbonate (PC), ethylenecarbonate (EC), 1,2-dimethoxyethane (DME), γ-butyrolactone (GBL), tetrahydrofuran (THF), 2-methyltetrahydrofuran (2-MeHF), 1,3-dioxolane, sulforane, acetonitrile (AN), diethylcarbonate (DEC), dimethylcarbonate (DMC), methyl ethyl carbonate (MEC) and dipropylcarbonate (DPC). These solvents may be used alone or as a mixture of two or more kinds.

An additive may be added to the nonaqueous electrolyte. Examples of the additive may include, but are not specifically limited to, vinylene carbonate (VC), vinylene acetate (VA), vinylene butyrate, vinylene hexanate, vinylene crotonate and cathecol carbonate. The concentration of the additive is preferably in the range of 0.1 wt % to 3 wt % with respect to 100 wt % of the nonaqueous electrolyte. A more preferable range is 0.5 wt % to 1 wt %.

3) Separator

The separator is not specifically limited as long as it has insulating property, and examples of the separator may include a porous film or nonwoven fabric made of a polymer such as polyolefin, cellulose, polyethylene terephthalate and vinylone. The materials for the separator may be used alone or as a combination of two or more kinds.

4) Housing

As the housing, a laminate film having a thickness of 0.5 mm or less or a metal container having a thickness of 1 mm or less is used. It is more preferable that the metal container have a thickness of 0.5 mm or less.

Examples of the shape of the housing, i.e., the shape of the battery, may include flat shape (thinned shape), square shape, cylindrical shape, coin shape, button shape and the like. Furthermore, the battery may be applied to both small size applications which are mounted on, for example, portable electronic devices and the like, and large size applications which are mounted on two- to four-wheel vehicles and the like.

As the laminated film, a multilayer film in which a metal layer is interposed between resin layers is used. For the purpose of weight saving, an aluminum foil or aluminum alloy foil is preferable as the metal layer. Examples of the resin layer may include polymer materials such as polypropylene (PP), polyethylene (PE), nylon and polyethylene terephthalate (PET). The laminated film may be formed into the shape of the housing by heat sealing.

The metal container may be made of aluminum, aluminum alloy or the like. As the aluminum alloy, an alloy comprising elements such as magnesium, zinc and silicon is preferable. When the alloy comprises a transition metal such as iron, copper, nickel and chromium, it is preferable that the amount thereof be adjusted to 100 ppm or less.

Figure 1:
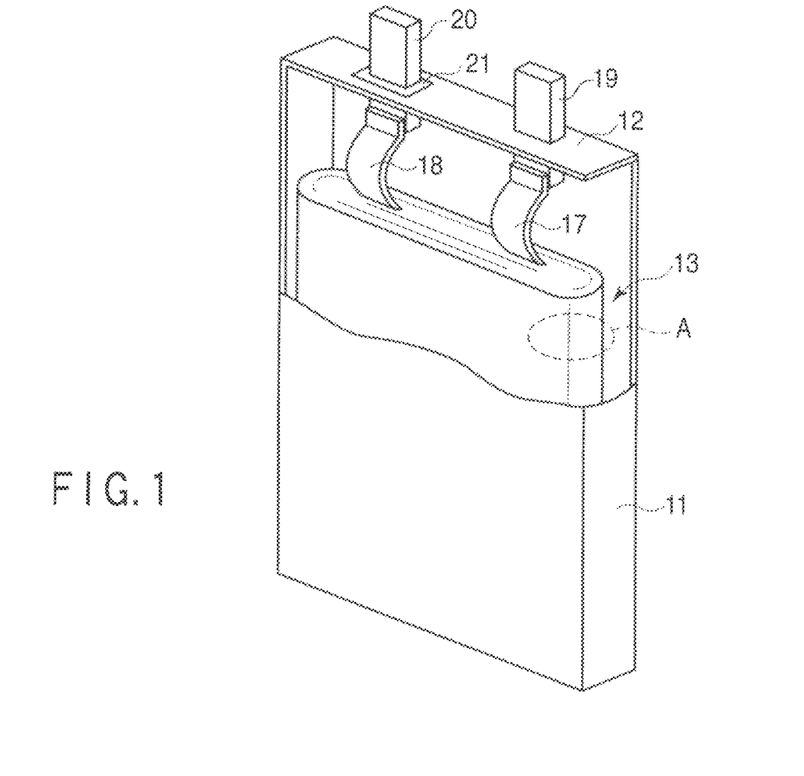
FIG. 1 is a partially cutaway perspective view of a nonaqueous electrolyte battery according to an embodiment.
Figure 2:
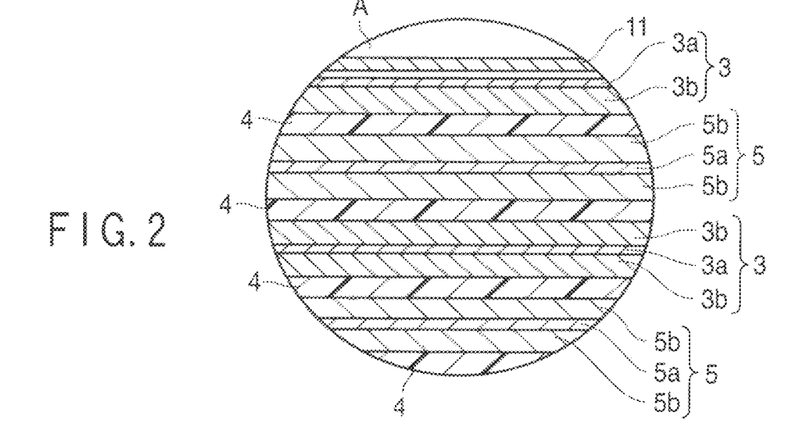
FIG. 2 is an enlarged cross-sectional view of the portion A of FIG. 1.

Next, the nonaqueous electrolyte battery according to the second embodiment is explained more specifically with referring to FIGS. 1 and 2. FIG. 1 is a partially cutaway perspective view of a square-shaped nonaqueous electrolyte battery, and FIG. 2 is an enlarged cross-sectional view of the portion A of FIG. 1. Each drawing is a schematic drawing for explaining and promoting understanding of the embodiment, and some of the shape, size, ratio and the like thereof are different from those of an actual apparatus but may be suitably designed and modified with reference to the following explanation and known techniques.

In the square-shaped nonaqueous electrolyte battery shown in FIG. 1, a coiled electrode group 13 is housed in a metallic rectangular cylindrical container with a bottom surface (housing) 11.

As shown in FIG. 2, the electrode group 13 is formed by rolling up a laminate, on which a negative electrode 3, a separator 4, a positive electrode 5 and a separator 4 have been laminated in this order from the outer side layer, in a spiral pattern and forming the laminate by pressing.

One end of a negative electrode tab 18 is electrically connected to a negative electrode current collector 3a, and the other end thereof is electrically connected to a negative electrode terminal 20 which is fixed on a rectangular lid 12 via a negative electrode gasket 21. One end of a positive electrode tab 17 is electrically connected to a positive electrode current collector 5a, and the other end thereof is electrically connected to a positive electrode terminal 19 which is fixed on the rectangular lid 12.

The nonaqueous electrolyte liquid (nonaqueous electrolytic solution) is injected from, for example, the opening of the container 11 and housed in the container 11. By welding the rectangular lid 12 on the opening of the container 11, the rolled-up electrode group 13 and nonaqueous electrolyte liquid are sealed in the container 11.

The negative electrode tab 18 is prepared by using, for example, materials such as aluminum, or an aluminum alloy comprising elements such as Mg, Ti, Zn, Mn, Fe, Cu and Si. It is preferable that the negative electrode tab 18 comprise a material similar to that of the negative electrode current collector so as to decrease the contact resistance against the negative electrode current collector.

The positive electrode tab 17 is prepared by using, for example, materials such as aluminum, or an aluminum alloy comprising elements such as Mg, Ti, Zn, Mn, Fe, Cu and Si. It is preferable that the positive electrode tab 17 comprise a material similar to that of the positive electrode current collector so as to decrease the contact resistance against the positive electrode current collector.

The nonaqueous electrolyte battery according to the embodiment may have high energy density, and increase in the resistance during the charge and discharge cycles may be lowered.

Third Embodiment

The battery pack according to the third embodiment has one or a plurality of nonaqueous electrolyte batteries (unit cells) of the second embodiment. When the battery pack comprises a plurality of unit cells, the unit cells are electrically connected in series or parallel.

Such battery pack is explained in detail with reference to FIGS. 3 and 4. As the unit cell, for example, a flat shape battery may be used.

A plurality of unit cells 21 which are composed of flat shape nonaqueous electrolyte batteries are laminated so that a negative electrode terminal 6 and positive electrode terminals 7 extending outward are aligned in the same direction and fastened by an adhesive tape 22 to constitute a battery module 23. As shown in FIG. 4, these unit cells 21 are electrically connected in series to each other.

A printed wiring board 24 is provided so as to face the side surfaces of the unit cells 21 from which the negative electrode terminal 6 and positive electrode terminals 7 extend. As shown in FIG. 4, a thermistor 25, a protective circuit 26 and a terminal 27 for energization to an external device are mounted on the printed wiring board 24. In addition, an insulation board (not shown) is attached to the surface of the printed wiring board 24 facing the battery module 23 so as to avoid unnecessary connection to the wiring of the battery module 23.

A positive electrode lead 28 is connected to the positive electrode terminal 7 which is located on the lowermost layer of the battery module 23, and the tip thereof is inserted in and electrically connected to a positive electrode connector 29 of the printed wiring board 24. A negative electrode lead 30 is connected to the negative electrode terminal 6 which is located on the uppermost layer of the battery module 23, and the tip thereof is inserted in and electrically connected to a negative electrode connector 31 of the printed wiring board 24. These connectors 29 and 31 are connected to a protective circuit 26 via wirings 32 and 33 which are formed on the printed wiring board 24.

The thermistor 25 detects the temperature of the unit cell 21, and the detected signal is transmitted to the protective circuit 26. The protective circuit 26 may interrupt a positive wiring 34a and a negative wiring 34b between the protective circuit 26 and the terminal 27 under a predetermined condition. The predetermined condition refers to, for example, a condition in which the detected temperature at the thermistor 25 reaches a predetermined temperature or more. Furthermore, the predetermined condition refers to a condition in which over-charge, over-discharge, overcurrent or the like of the unit cell 21 is detected. The over-charge or the like is detected for each unit cell 21 or whole unit cells 21. When detection is performed on each unit cell 21, a battery voltage may be detected, or a positive electrode potential or negative electrode potential may be detected. In the latter case, a lithium electrode to be used as a reference electrode is inserted in each unit cell 21. In the cases of FIGS. 3 and 4, a wiring 35 for detecting a voltage is connected to each unit cell 21, and the detected signal is transmitted to the protective circuit 26 via the wiring 35.

Protective sheets 36 made of rubber or resin are respectively provided on the three side surfaces of the battery module 23 except the side surface from which the positive electrode terminals 7 and negative electrode terminal 6 are projected. The battery module 23 is housed in a container 37 together with the protective sheets 36 and printed wiring board 24. Namely, the protective sheets 36 are located on the both inner side surfaces in the long-side direction and one inner side surface in the short-side direction of the container 37, and the printed wiring board 24 is located on the other inner side surface, which is opposite to the aforementioned inner side surface, in the short-side direction. The battery module 23 is located in the space surrounded with the protective sheets 36 and printed wiring board 24. A lid 38 is attached to the upper surface of the container 37.

In order to fix the battery module 23, a heat-shrinkable tape may be used instead of the adhesive tape 22. In this case, the protective sheets are provided on both side surfaces of the battery module and wrapped around with a heat-shrinkable tube, and the heat-shrinkable tube is shrunk under heating to bind the battery module.

Figure 3:
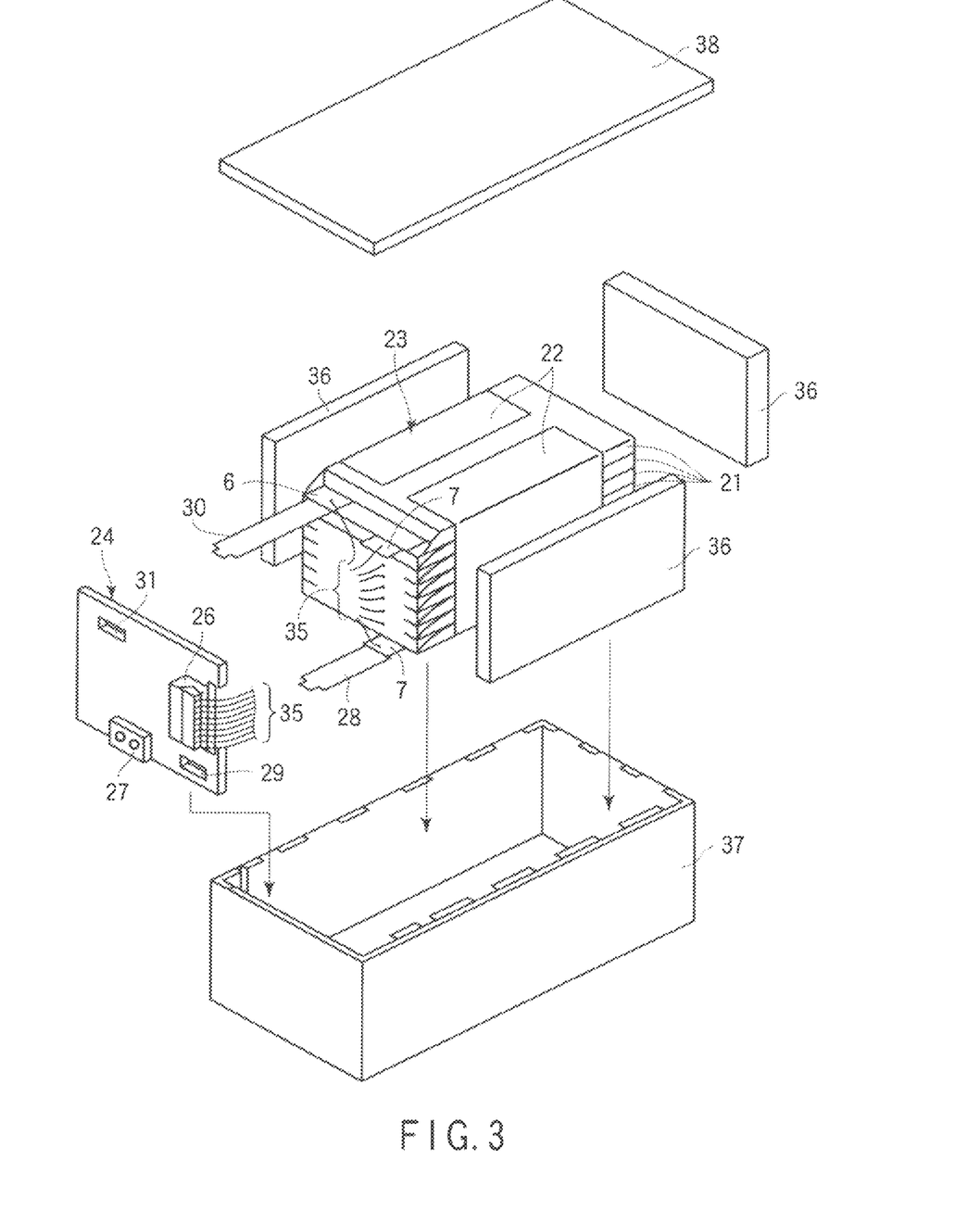
FIG. 3 is an exploded perspective view of a battery pack according to the embodiment.
Figure 4:
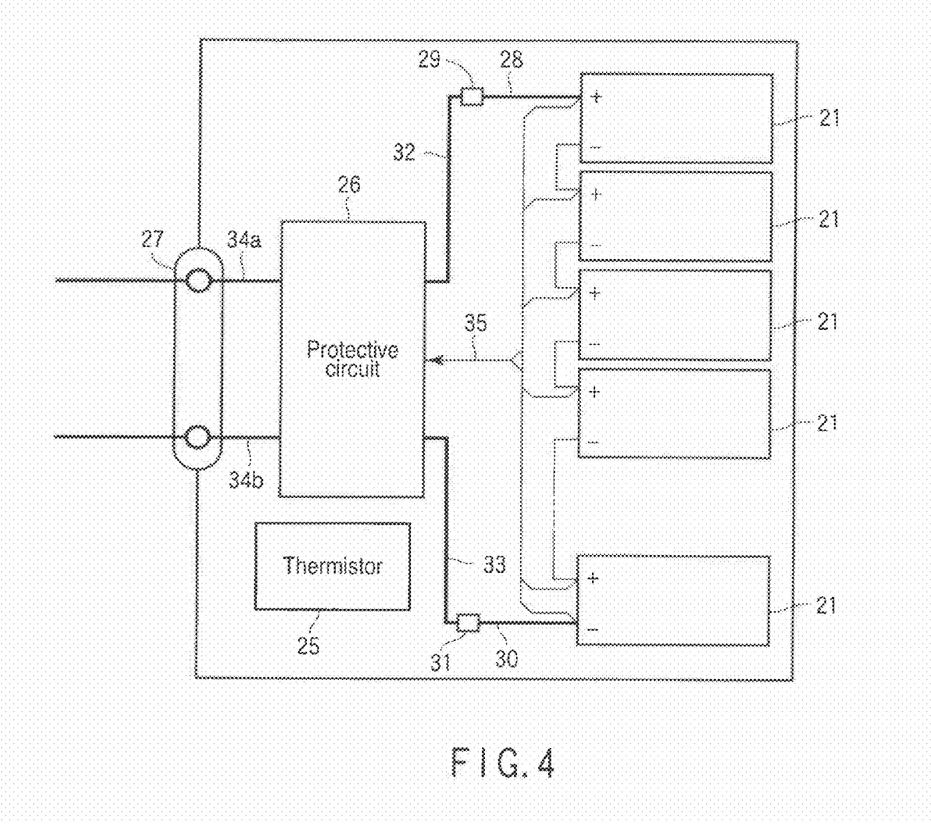
FIG. 4 is a block diagram showing an electrical circuit of the battery pack of FIG. 3.

Although an embodiment in which the unit cells 21 are connected in series is shown in FIGS. 3 and 4, the batteries may be connected in parallel so as to increase a battery capacity. Furthermore, the battery module packs may be connected in series or parallel.

Furthermore, the aspect of the battery pack is suitably changed according to the intended purpose. A preferable intended purpose of the battery pack is one in which a cycle performance at a large current is desired. Specific examples thereof may include use in power sources of digital cameras, and use in vehicles such as two- to four-wheel hybrid electric vehicles, two- to four-wheel electric vehicles and electric mopeds. Specifically, use in vehicles is preferable.

Hereinafter, Examples will be described. The embodiments are not limited to the examples described below, as long as they do not depart from the spirit of the embodiments.

Example A-1

<Preparation of Positive Electrode>

$LiNi_{0.33}Co_{0.33}Mn_{0.33}O_2$ (first oxide) was prepared as a positive electrode active material A, $LiCoO_2$ was prepared as a positive electrode active material B, graphite and acetylene black were prepared as conductive agents, and PVdF was prepared as a binder.

Next, 18 parts by weight of $LiCoO_2$ having an average particle diameter of 5 μm, 72 parts by weight of $LiNi_{0.33}Co_{0.33}Mn_{0.33}O_2$ having an average particle diameter of 6 μm, 6 parts by weight of graphite and acetylene black in total and 4 parts by weight of PVdF were dispersed in a solvent of N-methylpyrrolidone (NMP) by a bead mill using beads each having a bead diameter of 0.3 mm under a condition of a circumferential velocity of 600 rpm for 30 minutes to prepare a slurry. The slurry was applied on both surfaces of a current collector of an aluminum foil having a thickness of 15 μm, dried, and further pressed to prepare a positive electrode in which positive electrode layers were formed on the both surfaces of the current collector and the thickness of one surface was 28 μm. The content ratio of the positive electrode active material A (first oxide) to the weight of the positive electrode layer was 72 wt %.

Figure 5:
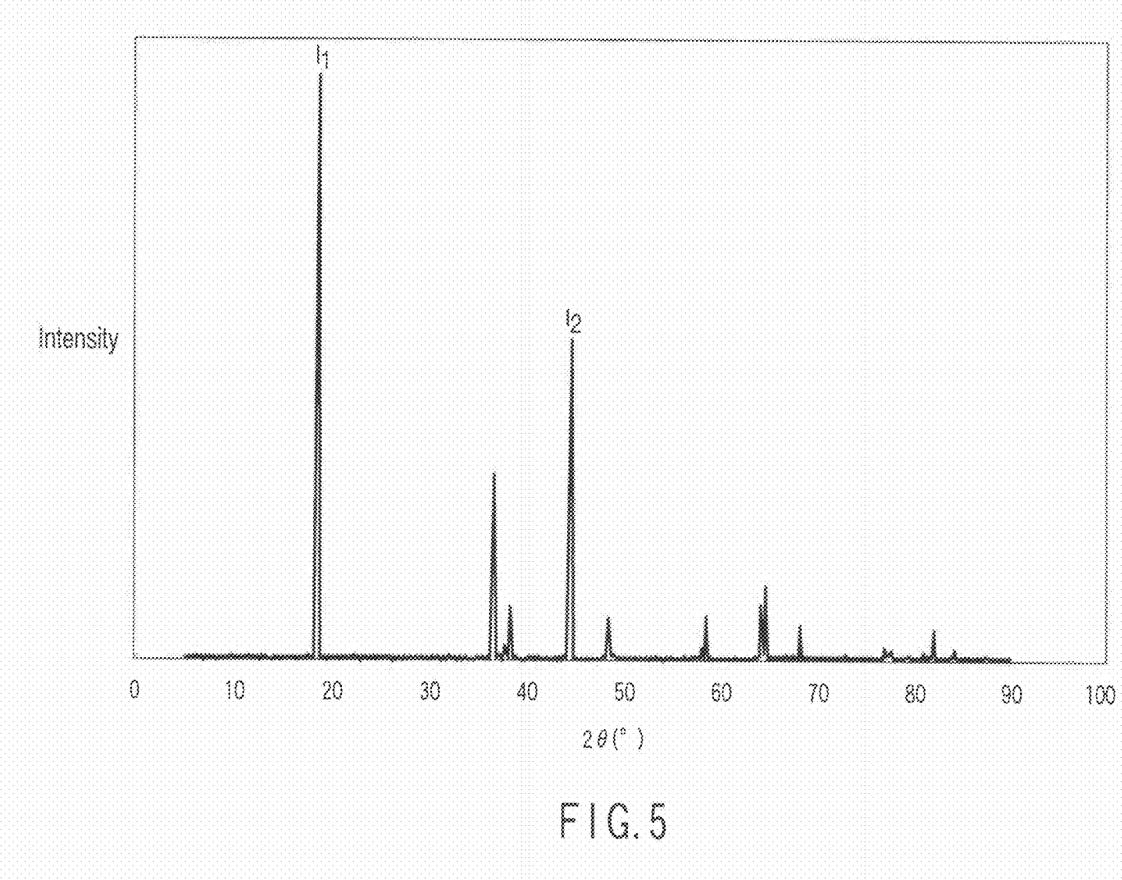
FIG. 5 is a graph showing an X-ray diffraction pattern of a positive electrode of Example A-1.

The X-ray diffraction pattern was measured according to the above-mentioned method using CuKα radiation for the surface of the positive electrode layer, and the X-ray diffraction pattern as shown in FIG. 5 was obtained. An intensity $I_1$ of a main peak at which 2θ of the X-ray diffraction pattern appears in the range of 15° to 25° and an intensity $I_2$ of a main peak at which 2θ of the X-ray diffraction pattern appears in the range of 40° to 50° in the X-ray diffraction pattern were calculated according to the above-mentioned method and an intensity ratio $(I_2/I_1)$ was obtained. As a result, the intensity ratio $(I_2/I_1)$ was 0.54.

<Preparation of Negative Electrode>

$Li_4Ti_5O_{12}$ was prepared as a negative electrode active material, graphite was prepared as a conductive agent, and PVdF was prepared as a binder.

Next, 100 parts by weight of $Li_4Ti_5O_{12}$, 5 parts by weight of graphite and 5 parts by weight of PVdF were dispersed in a solvent of N-methylpyrrolidone (NMP) to prepare a slurry. The slurry was applied on both surfaces of a current collector of an aluminum foil having a thickness of 15 μm, dried, and further formed by pressing to prepare a negative electrode in which negative electrode layers were formed on the both surfaces of the current collector and the thickness of one surface was 35 μm.

<Preparation of Nonaqueous Electrolyte>

1.5 M of $LiBF_4$ was mixed with a mixed solvent in which PC and DEC had been mixed at a volume ratio of 1:2 to prepare a nonaqueous electrolyte.

<Assembling of Battery>

A rectangular tubular container with a bottom surface made of aluminum and having a thickness of 0.3 mm, and an aluminum lid to which a positive electrode terminal was attached by insertion and a negative electrode terminal was attached by swaging via an insulating resin were prepared. A separator made of a polyethylene porous film was impregnated with a nonaqueous electrolyte, the positive electrode was covered with the separator, the negative electrode was superposed so as to face the positive electrode across the separator, and the electrodes were rolled-up in a spiral shape to form a spiral electrode group comprising lead tabs respectively extending from the positive electrode and negative electrode. The electrode group was formed into a flat shape by pressing. The positive electrode lead tab of the electrode group was connected to one end of the positive electrode terminal of the lid, the negative electrode lead tab was connected to one end of the negative electrode terminal, the electrode group was inserted together with the lid to the container through the opening of the container, and the lid was welded on the opening of the container. According to these steps, a square-shaped nonaqueous electrolyte battery having the above-mentioned structure shown in FIG. 1 and having a thickness of 3.0 mm, a width of 35 mm and a height of 62 mm was prepared.

Example A-2

A battery similar to Example A-1 was prepared except that $LiNi_{0.5}Co_{0.2}Mn_{0.3}O_2$ (first oxide) was used instead of $LiNi_{0.33}Co_{0.33}Mn_{0.33}O_2$ as the positive electrode active material. The $I_2/I_1$ of the positive electrode in this case was 0.50.

Example A-3

A battery similar to Example A-1 was prepared except that $LiNi_{0.6}Co_{0.2}Mn_{0.2}O_2$ (first oxide) was used instead of $LiNi_{0.33}Co_{0.33}Mn_{0.33}O_2$ as the positive electrode active material. The $I_2/I_1$ of the positive electrode in this case was 0.48.

Example A-4

A battery similar to Example A-1 was prepared except that $LiNi_{0.7}Co_{0.15}Mn_{0.15}O_2$ (first oxide) was used instead of $LiNi_{0.33}Co_{0.33}Mn_{0.33}O_2$ as the positive electrode active material. The $I_2/I_1$ of the positive electrode in this case was 0.58.

Example A-5

A battery similar to Example A-1 was prepared except that $LiNi_{0.8}Co_{0.1}Mn_{0.1}O_2$ (first oxide) was used instead of $LiNi_{0.33}Co_{0.33}Mn_{0.33}O_2$ as the positive electrode active material. The $I_2/I_1$ of the positive electrode in this case was 0.54.

Example A-6

A battery similar to Example A-1 was prepared except that $LiNi_{0.8}Co_{0.17}Al_{0.03}O_2$ (second oxide) was used instead of $LiNi_{0.33}Co_{0.33}Mn_{0.33}O_2$ as the positive electrode active material. The $I_2/I_1$ of the positive electrode in this case was 0.52.

Example A-7

A battery similar to Example A-1 was prepared except that a slurry was prepared by dispersion using a bead mill using beads having a bead diameter of 1.0 mm under the condition of a circumference velocity of 1000 rpm for 30 minutes. The $I_2/I_1$ of the positive electrode in this case was 0.27.

Example A-8

A battery similar to Example A-1 was prepared except that a slurry was prepared by using a rotation and revolution mixer (e.g., MIXER (AWATORI-RENTARO) ARE-310 manufactured by THINKY) for a dispersion period of 10 minutes. The $I_2/I_1$ of the positive electrode in this case was 0.68.

The source of generation of disintegration force in the rotation and revolution mixer is collision of the particles in the slurry and collision of the particles against the inner walls of the container. The disintegration force depends on the weight of the colliding particles. Therefore, a mixer which utilizes collision with beads having a heavier weight than the particles in the slurry generates a greater disintegration force than that generated by a rotation and revolution mixer which utilizes collision of the particles in the slurry.

Comparative Example A-1

A battery similar to Example A-1 was prepared except that a slurry was prepared by dispersion using a bead mill using beads each having a bead diameter of 2.0 mm under the condition of a circumference velocity of 1600 rpm for 40 minutes. The $I_2/I_1$ of the positive electrode in this case was 0.20.

Comparative Example A-2

A battery similar to Example A-1 was prepared except that a slurry was prepared by using a rotation and revolution mixer (e.g., MIXER (AWATORI-RENTARO) ARE-310 manufactured by THINKY) for a dispersion period of 1 minute. The $I_2/I_1$ of the positive electrode in this case was 0.75.

Comparative Example B-1

A battery similar to Example A-1 was prepared except that only $LiCoO_2$ was used as the positive electrode active material. The $I_2/I_1$ of the positive electrode in this case was 0.27.

Comparative Example B-2

A battery similar to Comparative Example A-1 was prepared except that only $LiCoO_2$ was used as the positive electrode active material. The $I_2/I_1$ of the positive electrode in this case was 0.12.

Example C-1

A battery similar to Example A-1 was prepared except that only $LiNi_{0.33}Co_{0.33}Mn_{0.33}O_2$ was used as the positive electrode active material. The $I_2/I_1$ of the positive electrode in this case was 0.52.

Example C-2

A battery similar to Comparative Example A-1 was prepared except that only $LiNi_{0.33}Co_{0.33}Mn_{0.33}O_2$ was used as the positive electrode active material. The $I_2/I_1$ of the positive electrode in this case was 0.22.

Example D

A battery similar to Example A-1 was prepared except that the positive electrode active material A having the composition shown in the following Table 4 was used instead of $LiNi_{0.33}Co_{0.33}Mn_{0.33}O_2$. The $I_2/I_1$ of the positive electrode in this case is also described in Table 4.

The increase ratio of the battery resistance of each battery after charge and discharge were repeated 500 cycles under the condition of the charge and discharge rate of 1 C and the voltage range of 2.95 to 1.50 V under the circumstance of 45° C. was calculated according to the following formula:

$$(R2/R1) \times 100$$

wherein R1 is a value of resistance before cycles, and R2 is a value of resistance after 500 cycles. The results thereof are shown in the following Tables 1 to 4.

TABLE 1

| | Positive electrode active material A | Positive electrode active material B | Content ratio of positive electrode active material A (wt. %) | Intensity ratio ($I_2/I_1$) | Increase ratio of battery resistance (%) |
|---|---|---|---|---|---|
| Example A-1 | $LiNi_{0.33}Co_{0.33}Mn_{0.33}O_2$ | $LiCoO_2$ | 72 | 0.54 | 130 |
| Example A-2 | $LiNi_{0.5}Co_{0.2}Mn_{0.3}O_2$ | $LiCoO_2$ | 72 | 0.50 | 140 |
| Example A-3 | $LiNi_{0.6}Co_{0.2}Mn_{0.2}O_2$ | $LiCoO_2$ | 72 | 0.48 | 175 |
| Example A-4 | $LiNi_{0.7}Co_{0.15}Mn_{0.15}O_2$ | $LiCoO_2$ | 72 | 0.58 | 180 |
| Example A-5 | $LiNi_{0.8}Co_{0.1}Mn_{0.1}O_2$ | $LiCoO_2$ | 72 | 0.54 | 200 |
| Example A-6 | $LiNi_{0.8}Co_{0.17}Al_{0.03}O_2$ | $LiCoO_2$ | 72 | 0.52 | 190 |
| Example A-7 | $LiNi_{0.33}Co_{0.33}Mn_{0.33}O_2$ | $LiCoO_2$ | 72 | 0.27 | 180 |
| Example A-8 | $LiNi_{0.33}Co_{0.33}Mn_{0.33}O_2$ | $LiCoO_2$ | 72 | 0.68 | 210 |
| Comparative Example A-1 | $LiNi_{0.33}Co_{0.33}Mn_{0.33}O_2$ | $LiCoO_2$ | 72 | 0.20 | 350 |
| Comparative Example A-2 | $LiNi_{0.33}Co_{0.33}Mn_{0.33}O_2$ | $LiCoO_2$ | 72 | 0.75 | 300 |

TABLE 2

| | Positive electrode active material A | Positive electrode active material B | Content ratio of positive electrode active material A (wt. %) | Intensity ratio ($I_2/I_1$) | Increase ratio of battery resistance (%) |
|---|---|---|---|---|---|
| Comparative Example B-1 | — | $LiCoO_2$ | 0 | 0.27 | 150 |
| Comparative Example B-2 | — | $LiCoO_2$ | 0 | 0.12 | 150 |

TABLE 3

| | Positive electrode active material A | Positive electrode active material B | Content ratio of positive electrode active material A (wt. %) | Intensity ratio ($I_2/I_1$) | Increase ratio of battery resistance (%) |
|---|---|---|---|---|---|
| Example C-1 | $LiNi_{0.33}Co_{0.33}Mn_{0.33}O_2$ | — | 100 | 0.52 | 160 |
| Comparative Example C-1 | $LiNi_{0.33}Co_{0.33}Mn_{0.33}O_2$ | — | 100 | 0.22 | 400 |

TABLE 4

| | Kind of M | Positive electrode active material A | Positive electrode active material B | Content ratio of positive electrode active material A (wt. %) | Intensity ratio ($I_2/I_1$) | Increase ratio of battery resistance (%) |
|---|---|---|---|---|---|---|
| Example D-1 | Mg | $LiNi_{0.33}Co_{0.32}Mn_{0.33}Mg_{0.01}O_2$ | $LiCoO_2$ | 72 | 0.52 | 140 |
| Example D-2 | Al | $LiNi_{0.33}Co_{0.32}Mn_{0.33}Al_{0.01}O_2$ | $LiCoO_2$ | 72 | 0.51 | 145 |
| Example D-3 | Si | $LiNi_{0.33}Co_{0.32}Mn_{0.33}Si_{0.01}O_2$ | $LiCoO_2$ | 72 | 0.50 | 145 |
| Example D-4 | Ti | $LiNi_{0.33}Co_{0.32}Mn_{0.33}Ti_{0.01}O_2$ | $LiCoO_2$ | 72 | 0.53 | 150 |
| Example D-5 | Zn | $LiNi_{0.33}Co_{0.32}Mn_{0.33}Zn_{0.01}O_2$ | $LiCoO_2$ | 72 | 0.53 | 140 |

TABLE 4-continued

| Kind of M | Positive electrode active material A | Positive electrode active material B | Content ratio of positive electrode active material A (wt. %) | Intensity ratio ($I_2/I_1$) | Increase ratio of battery resistance (%) |
|---|---|---|---|---|---|
| Example D-6 | Zr | $LiNi_{0.33}Co_{0.32}Mn_{0.33}Zr_{0.01}O_2$ | $LiCoO_2$ | 72 | 0.54 | 145 |
| Example D-7 | Ca | $LiNi_{0.33}Co_{0.32}Mn_{0.33}Ca_{0.01}O_2$ | $LiCoO_2$ | 72 | 0.51 | 145 |
| Example D-8 | Sn | $LiNi_{0.33}Co_{0.32}Mn_{0.33}Sn_{0.01}O_2$ | $LiCoO_2$ | 72 | 0.52 | 150 |

From the comparison between Examples A-1 to A-8 and Comparative Examples A-1 and A-2 in Table 1, it is found that the increase in the resistance during repetition of the charge and discharge cycles may be suppressed by adjusting ($I_2/I_1$) to the range of 0.25 to 0.7. It is inferred that the resistance was increased in accordance with the increase in the reactivity with the electrolyte liquid due to increase in the surface area of the electrode in Comparative Example A1 wherein the intensity ratio ($I_2/I_1$) was less than 0.25. On the other hand, it is inferred that the resistance of the electrode was increased due to the insufficient dispersion state of the conductive agent in Comparative Example A2 wherein the intensity ratio ($I_2/I_1$) was more than 0.7, and therefore the overvoltage was increased, as a result, the resistance was increased due to the growth of a film generated by a side reaction due to the increase in overvoltage. It is found from comparison between Examples A-1, A-7 and A-8 that the increase ratio of the resistance after repeating the charge and discharge cycles was small in Example A-1 wherein the intensity ratio ($I_2/I_1$) was 0.3 to 0.55.

Figure 6:
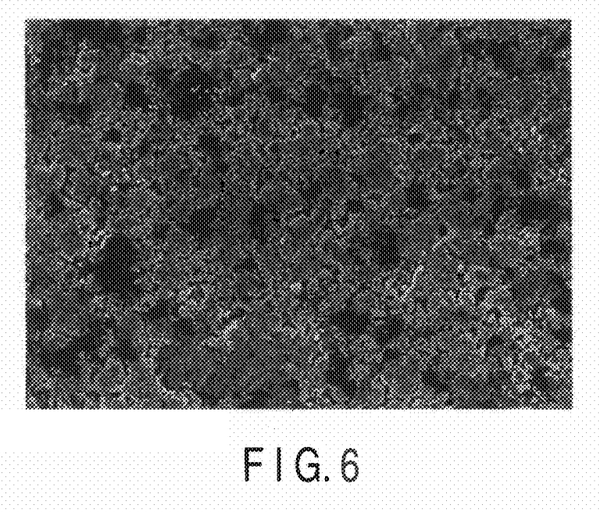
FIG. 6 is an electron micrograph of the positive electrode of Example A-1.
Figure 7:
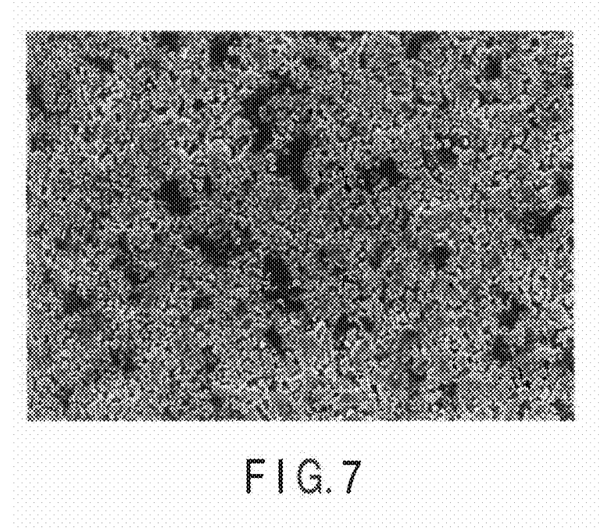
FIG. 7 is an electron micrograph of the positive electrode of Comparative Example A-1.

An electron micrograph taken by a scanning electron microscope under 2000-power magnification of the positive electrode of Example A-1 is shown in FIG. 6, and an electron micrograph taken by a scanning electron microscope under 2000-power magnification of the positive electrode of Comparative Example A-1 is shown in FIG. 7. As is apparent from FIG. 6, it is found that many particles of the positive electrode active material which keep the form of the secondary particle existed in the positive electrode of Example A-1. On the other hand, it is found that fine particles were dispersed uniformly and there was hardly any aggregation of the primary particles in the positive electrode of Comparative Example A-1.

From the comparison between Comparative Examples B-1 and B-2 in Table 2, it is found that the increase ratio of the battery resistance in Comparative Example B-1, in which the intensity ratio ($I_2/I_1$) was 0.25 to 0.7, was not different from that in Comparative Example B-2 in which the intensity ratio ($I_2/I_1$) was lower than 0.25, and thus the effect of the embodiment could not be obtained even if the intensity ratio ($I_2/I_1$) was adjusted to the range of 0.25 to 0.7 in $LiCoO_2$ which is formed by only primary particles which do not form secondary particles.

From the comparison between Example C-1 and Comparative Example C-1 in Table 3, it is found that the effect of the embodiment can be obtained even if $LiNi_{0.33}Co_{0.33}Mn_{0.33}O_2$ was used alone as the positive electrode active material. However, the increase ratio of resistance after repeating the charge and discharge cycles was higher than that of Example A-1 in which a mixture of $LiNi_{0.33}Co_{0.33}Mn_{0.33}O_2$ and $LiCoO_2$ was used as the positive electrode active material. This is considered to be attributed to the difference due to generation of some gas when $LiNi_{0.33}Co_{0.33}Mn_{0.33}O_2$ was used alone. Although the cause of the increase in generation of gas is unclear, it is inferred that the increase in the voltage at the end of charging on the charge curve of the electrode using $LiNi_{0.33}Co_{0.33}Mn_{0.33}O_2$ alone was more rapid than that on the charge curve of the mixed electrode of $LiNi_{0.33}Co_{0.33}Mn_{0.33}O_2$ and $LiCoO_2$, whereby the overvoltage applied to the positive electrode was increased and the oxidation reaction between the positive electrode and non-aqueous electrolyte was increased.

As shown in Table 4, it is found that a similar effect to that of Example A can be obtained when at least one element selected from the group consisting of Mg, Al, Si, Ti, Zn, Zr, Ca and Sn was used as the element M for the oxide.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode comprising:
a positive electrode current collector: and
a positive electrode layer comprising a positive electrode active material, a conductive agent and a binder,
the positive electrode active material comprising $LiCoO_2$ and at least one of a first oxide represented by formula ($\alpha$) and a second oxide represented by formula ($\beta$), the positive electrode layer having an intensity ratio falling within a range of 0.25 to 0.7, the ratio being represented by formula (1) in an X-ray diffraction pattern obtained by using CuK$\alpha$ radiation for a surface of the positive electrode layer:

$$Li_xNi_{1-a-b}Co_aMn_bM_cO_2 \qquad (\alpha)$$

wherein 0.9<x≤1.25, 0<a≤0.4, 0<b≤0.45, 0<c≤0.1, and M is at least one element selected from the group consisting of Mg, Al, Si, Ti, Zn, Zr, Ca and Sn, $$Li_xNi_{1-a-c}Co_aM_cO_2 \qquad (\beta)$$

wherein 0.9<x≤1.25, 0<a≤0.4, 0<c≤0.1, and M is at least one element selected from the group consisting of Mg, Si, Ti, Zn, Zr, Ca and Sn, $$I_2/I_1 \qquad (1)$$

wherein $I_1$ is an intensity of a main peak in 2θ falling within a range of 15° to 25° in the X-ray diffraction pattern, and $I_2$ is an intensity of a main peak in 2θ falling within a range of 40° to 50° in the X-ray diffraction pattern, wherein a content of the at least one of the first oxide and the second oxide is from 60 wt % to 95 wt %, relative to the total weight of components present in the positive electrode layer, and wherein the positive electrode active material further comprises at least one selected from the group consisting of manganese dioxide, iron oxide, copper oxide, nickel oxide, $Li_aMnO_2$, where $0<a\leq1.2$, lithium-cobalt composite oxide, lithium-manganese-cobalt composite oxide, lithium-manganese-nickel composite oxide, spinel-type lithium-manganese composite oxide, spinel-type lithium-manganese nickel composite oxide, lithium phosphorous oxide having an olivine structure, iron sulfate, vanadium oxide, polyaniline, polypyrrole, disulfide polymer materials, fluorocarbons and sulfur.

2. The positive electrode according to claim 1, wherein formula ($\beta$) satisfies $0<a\leq0.2$, and $0<c\leq0.05$.

3. The positive electrode according to claim 1, wherein the intensity ratio falls within a range of 0.3 to 0.55.

4. The positive electrode according to claim 3, wherein formula ($\alpha$) satisfies $0<a\leq0.2$, $0<b\leq0.3$, and $0<c\leq0.01$.

5. The positive electrode according to claim 3, wherein formula ($\beta$) satisfies $0<a\leq0.2$, and $0<c\leq0.05$.

6. The positive electrode according to claim 1, wherein the positive electrode active material is dispersed in the binder, and wherein the binder is present in the positive electrode layer in an amount of at least 2 wt %, relative to the amounts for all materials present in the positive electrode layer.

7. The electrode according to claim 1, wherein the positive electrode active material is dispersed in the binder, wherein the binder is present in the positive electrode layer in an amount of at least 2 wt %, relative to the amounts for all materials present in the positive electrode layer, and wherein the $I_2/I_1$ ratio is an index of dispersibility of the positive electrode active material in the binder.

8. The electrode according to claim 1, wherein formula ($\beta$) satisfies:

$0.03\leq c\leq0.1$.

9. A nonaqueous electrolyte battery comprising:
the positive electrode according to claim 1;
a negative electrode; and
a nonaqueous electrolyte.

10. A battery pack comprising the nonaqueous electrolyte battery according to claim 9.

11. The battery pack according to claim 10, comprising nonaqueous electrolyte batteries each of which is the nonaqueous electrolyte battery, wherein the nonaqueous electrolyte batteries are electrically connected in series or parallel.

12. The battery pack according to claim 10, further comprising:
a protective circuit; and
an external terminal.

13. A vehicle comprising the battery pack according to claim 10.

14. A positive electrode comprising:
a positive electrode current collector; and
a positive electrode layer comprising a positive electrode active material, a conductive agent and a binder,
the positive electrode active material comprising at least one of a first oxide represented by formula ($\alpha$) and a second oxide represented by formula ($\beta$), the positive electrode layer having an intensity ratio falling within a range of 0.25 to 0.7, the ratio being represented by formula (1) in an X-ray diffraction pattern obtained by using CuK$\alpha$ radiation for a surface of the positive electrode layer:

$$Li_xNi_{1-a-b}Co_aMn_bM_cO_2 \quad (\alpha)$$

wherein $0.9<x\leq1.25$, $0<a\leq0.4$, $0<b\leq0.45$, $0<c\leq0.1$, and M is at least one element selected from the group consisting of Mg, Al, Si, Ti, Zn, Zr, Ca and Sn, $$Li_xNi_{1-a-c}Co_aM_cO_2 \quad (\beta)$$

wherein $0.9<x\leq1.25$, $0<a\leq0.4$, $0<c\leq0.1$, and M is at least one element selected from the group consisting of Mg, Si, Ti, Zn, Zr, Ca and Sn, $$I_2/I_1 \quad (1)$$

wherein $I_1$ is an intensity of a main peak in 2θ falling within a range of 15° to 25° in the X-ray diffraction pattern, and $I_2$ is an intensity of a main peak in 2θ falling within a range of 40° to 50° in the X-ray diffraction pattern, wherein a portion of the active material, a portion of the conductive agent, and a portion of the binder are present on a surface of the positive electrode layer, wherein a content of the at least one of the first oxide and the second oxide is from 60 wt % to 95 wt %, relative to the total weight of components present in the positive electrode layer, and wherein the positive electrode active material further comprises at least one selected from the group consisting of manganese dioxide, iron oxide, copper oxide, nickel oxide, $Li_aMnO_2$, where $0<a\leq1.2$, lithium-cobalt composite oxide, lithium-manganese-cobalt composite oxide, lithium-manganese-nickel composite oxide, spinel-type lithium-manganese composite oxide, spinel-type lithium-manganese nickel composite oxide, lithium phosphorous oxide having an olivine structure, iron sulfate, vanadium oxide, polyaniline, polypyrrole, disulfide polymer materials, fluorocarbons and sulfur.

15. A nonaqueous electrolyte battery comprising:
the positive electrode according to claim 14;
a negative electrode; and
a nonaqueous electrolyte.

16. A battery pack comprising the nonaqueous electrolyte battery according to claim 15.

17. The battery pack according to claim 16, comprising nonaqueous electrolyte batteries each of which is the nonaqueous electrolyte battery, wherein the nonaqueous electrolyte batteries are electrically connected in series or parallel.

18. The battery pack according to claim 16, further comprising:

a protective circuit; and
an external terminal.

19. A vehicle comprising the battery pack according to claim 16.

* * * * *